(12) United States Patent
Hsieh

(10) Patent No.: US 9,134,897 B2
(45) Date of Patent: Sep. 15, 2015

(54) ELECTRONIC SYSTEM AND METHOD FOR OPERATING TOUCH SCREEN THEREOF

(75) Inventor: Kin-Hsing Hsieh, Taipei (TW)

(73) Assignee: VIA TECHNOLOGIES, INC., Hsin-Tien Taipei (TW)

( * ) Notice: Subject to any disclaimer, the term of this patent is extended or adjusted under 35 U.S.C. 154(b) by 894 days.

(21) Appl. No.: 12/766,994

(22) Filed: Apr. 26, 2010

(65) Prior Publication Data
US 2011/0265045 A1 Oct. 27, 2011

(51) Int. Cl.
*G06F 3/033* (2013.01)
*G06F 3/0488* (2013.01)

(52) U.S. Cl.
CPC .................................. *G06F 3/04883* (2013.01)

(58) Field of Classification Search
CPC ... G06F 3/017; G06F 3/04883; G06F 3/0488; G06F 3/048; G06F 2203/04808; H04M 2250/12; H04M 2250/22
USPC ............ 715/863; 713/156, 154, 182; 345/156
See application file for complete search history.

(56) References Cited

U.S. PATENT DOCUMENTS

| | | | | |
|---|---|---|---|---|
| 5,821,933 A * | 10/1998 | Keller et al. | ................... | 715/741 |
| 7,593,000 B1 * | 9/2009 | Chin | ............... | 345/156 |
| 7,627,904 B2 * | 12/2009 | Tokkonen | ....................... | 726/27 |
| 2005/0052406 A1 * | 3/2005 | Stephanick et al. | ........... | 345/156 |
| 2005/0212760 A1 * | 9/2005 | Marvit et al. | ................ | 345/156 |
| 2005/0253817 A1 * | 11/2005 | Rytivaara et al. | ............. | 345/173 |
| 2006/0053301 A1 * | 3/2006 | Shin | ............................... | 713/183 |
| 2006/0075250 A1 * | 4/2006 | Liao | ................................. | 713/182 |
| 2007/0236330 A1 * | 10/2007 | Cho et al. | ....................... | 340/5.54 |
| 2008/0134170 A1 * | 6/2008 | Astheimer | ..................... | 717/175 |
| 2008/0278455 A1 * | 11/2008 | Atkins et al. | .................. | 345/173 |
| 2009/0085877 A1 * | 4/2009 | Chang et al. | .................. | 345/173 |
| 2009/0289916 A1 * | 11/2009 | Dai | ................................ | 345/173 |
| 2010/0240415 A1 * | 9/2010 | Kim et al. | ...................... | 455/565 |
| 2010/0321304 A1 * | 12/2010 | Rofougaran | .................. | 345/173 |
| 2010/0328032 A1 * | 12/2010 | Rofougaran | ................. | 340/5.82 |
| 2011/0053641 A1 * | 3/2011 | Lee et al. | .................... | 455/556.1 |

FOREIGN PATENT DOCUMENTS

| | | |
|---|---|---|
| CN | 101634925 | 1/2010 |
| TW | 200825837 | 6/2008 |
| TW | 200844837 | 11/2008 |
| TW | 200847001 | 12/2008 |

OTHER PUBLICATIONS

Chinese language office action dated Mar. 23, 2011.
(Continued)

*Primary Examiner* — Nicholas Augustine
*Assistant Examiner* — Andres E Gutierrez
(74) *Attorney, Agent, or Firm* — McClure, Qualey & Rodack, LLP

(57) ABSTRACT

The disclosure provides an unlock method of an electronic system with a touch screen. The unlock method includes steps below: receiving a triggering event when the system is locked; activating the touch screen in response to the event; receiving an input gesture; comparing the gesture with a customized gesture; unlocking the system in case that the input gesture is matched to the customized gesture, which is customized by user, and is not a default unlock gesture built in the electronic system.

20 Claims, 4 Drawing Sheets

(56) References Cited

OTHER PUBLICATIONS

English language translation of abstract of CN 101634925 (published Jan. 27, 2010).
English language translation of abstract of TW 200825837 (published Jun. 16, 2008).
English language translation of abstract of TW 200844837 (published Nov. 16, 2008).
English language translation of abstract of TW 200847001 (published Dec. 1, 2008).

* cited by examiner

ELECTRONIC SYSTEM AND METHOD FOR OPERATING TOUCH SCREEN THEREOF

BACKGROUND OF THE INVENTION

1. Field of the Invention

The present invention refers to electronic system with touch screen, and in particular to method for unlocking the electronic system with touch screen.

2. Description of the Related Art

Touch screen as a main input/output apparatus of electronics is more and more popular recently. Famous consumer products such as Apple iPhone and iTouch and flat screen computer operating Microsoft Windows 7 are good examples.

Since power saving function is already a mandatory design for modern electronics, all of these electronics have procedures to enter and exit power saving operation mode. Take iPhone as an example, there is one button on top of the case for locking system. After it is pressed, system will deactivate touch screen and enter power saving mode. There is another button below the touch screen face for unlocking the system. After the button is pressed, the touch screen would be activated to wait for user input. Then the touch screen shows a bar which could be dragged by user finger. If user does drag the bar into a predetermined position, desktop would be shown on the touch screen and system would be unlocked. If the system is further configured to ask for password, touch screen would show virtual keyboard in response to the unlock button is pressed or to the bar is dragged to the position. Once correct password is input, desktop would be shown on the touch screen and system would be unlocked.

However, users cannot customize unlocking procedures of present electronics. Default bar and virtual keyboard is the only way to unlock the system. Therefore there exists a need for user to customize unlock procedure while maximizing the flexibility of touch screen.

BRIEF SUMMARY OF THE INVENTION

The present disclosure provides a method for unlocking an electronic system equipping with a touch screen. The method comprises the following steps: receiving a trigger event when the electronic system is locked; activating the touch screen; receiving an input gesture by the touch screen; comparing the input gesture with a customized gesture; and unlocking the electronic system if the input gesture and the customized gesture are matched. The customized gesture is customized by user of the electronic system, not a default unlock gesture built in the electronic system.

The present disclosure provides a method for customizing a customized gesture to unlock an electronic system equipping with a touch screen. The method comprises receiving the customized gesture; setting a parameter set of the customized gesture; and affirming the customized gesture according to the parameter set. The customized gesture is customized by user of the electronic system, not a default unlock gesture built in the electronic system.

The present disclosure provides a controller for an electronic system equipping with a touch screen. The controller comprises a trigger event receiver module for receiving a trigger event when the electronic system is locked; a touch screen control module for activating the touch screen and receiving an input gesture; and a computing and control module for comparing the input gesture with a customized gesture and unlocking the electronic system if the input gesture and the customized gesture are matched. The customized gesture is customized by user of the electronic system, not a default unlock gesture built in the electronic system.

The present disclosure provides an electronic system comprising a case, a touch screen, and a controller. The touch screen is encapsulated by the case. The controller is encapsulated by the case and coupled to the touch screen. The controller comprises a trigger event receiver module for receiving a trigger event when the electronic system is locked; a touch screen control module for activating the touch screen and receiving an input gesture; and a computing and control module for comparing the input gesture with a customized gesture and unlocking the electronic system if the input gesture and the customized gesture are matched. The customized gesture is customized by user of the electronic system, not a default unlock gesture built in the electronic system.

A detailed description is given in the following embodiments with reference to the accompanying drawings.

BRIEF DESCRIPTION OF THE DRAWINGS

The invention can be more fully understood by referring to the following detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
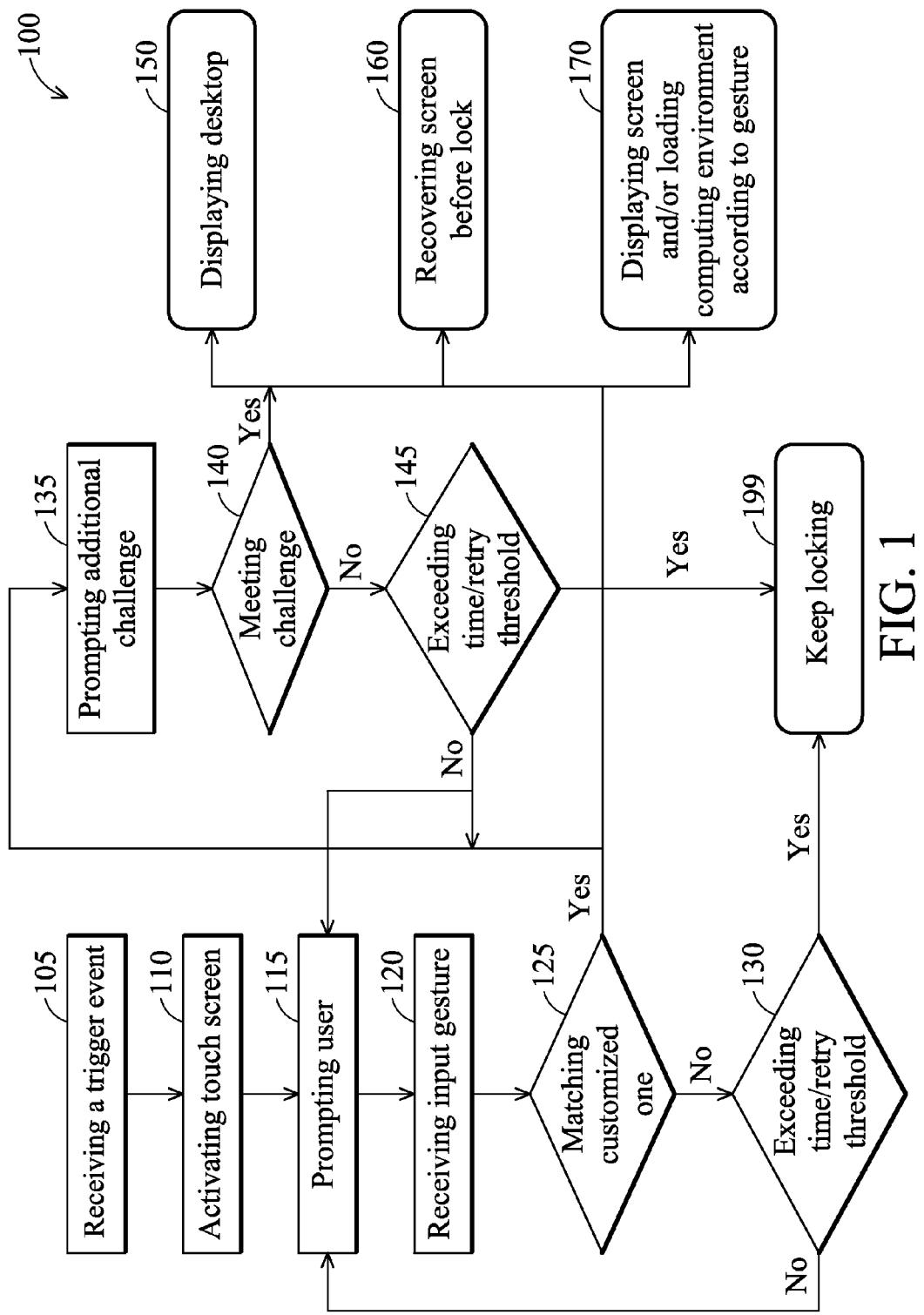
FIG. 1 shows a flow chart of one embodiment in accordance with the present invention.

Please refer to FIG. 1, which shows a flow chart 100 of one embodiment in accordance with the present invention. The flow chart 100 may be applied on an electronics system equipped with a touch screen. At the beginning of the flow 100, the electronics system is already locked and the touch screen is off to display. First, at step 105, the system receives a trigger event, which may be in response to a button is pressed by user. In another example, the scan or wake up period of the touch screen is lengthened when the system is locked. The trigger event may be generated by the touch screen in response to user's long touch, i.e., user endures touch to the screen longer than normal touch operation. Moreover, the trigger event may be generated by another touch sensitive component other than touch screen in response to user's touch. For example, a finger print scanner may be used to generate the trigger event. Furthermore, the trigger event may be generated by an acceleration and/or motion sensor of the electronic system in response to movement of the system. In addition, the trigger event may be generated by a photonic sensor and/or camera of the electronic system in response to changes of lightness or captured picture. In summarized, any interrupt generated remotely or by local hardware/software of the electronics system could be used as the trigger event.

At next step 110, at least display apparatus of the touch screen is activated or turned on. If applicable, the scan or wake up period of the touch screen is recovered to normal. At step 115, the system prompts user to unlock the electronics system. The prompting herein refers to any combination of text, graphics, animation, and sound. Just activating the touch screen is also a kind of prompt. So the step 115 is optional. The prompt may comprise a default or built-in form, such as a bar to be dragged. It may comprise a customized form such as showing text on the touch screen for demanding user to input a specific gesture. The gesture in this present disclosure refers to absolute and/or relative trace of one or multiple fingers contracting the touch screen. The parameters of the gesture trace include at least any one of dimension, orientation, time duration, and pressure. After the input gesture is received at step 120, the system may determine whether the input gesture is matched with a pre-determined gesture at step 125. The pre-determined gesture may be the default or built-in gesture of the electronic system. It may also comprise a customable gesture defined by user. In accordance with the present invention, the match of gestures depends on variable definitions. For example, in case that some of gesture parameters such as dimension, orientation, time duration, and pressure of two gestures are differed within an acceptable error range, the two gestures are matched. In other words, if any combination of the gesture parameters of two gestures is differed within the error range, the system determines that the two gestures are matched.

Take one example, a customized gesture defined by user is an absolute trace of a single finger writing one "8" shape. The customized "8" gesture at least comprises four parameters in the followings: dimension, orientation, time duration, and pressure. User chooses to tolerate 30% error range for the two parameters, dimension and orientation, and to ignore the other two parameters, time duration and pressure. Therefore at step 120, the electronics system only compares the chosen parameters, dimension and orientation, of the input gesture with the customized gesture. If the input gesture differs to the customized gesture within 30% range in dimension and orientation, these two gestures are determined as a match by the system; otherwise, the flow goes to step 130.

At the step 130, the number of retry is compared with a threshold number and/or the pending time since the trigger event or the flow is compared with a threshold time limit. If the number of retry exceeds the threshold number and/or the pending time exceeds the threshold time limit, the flow goes to the step 199. At this final step, the system returns to the lock state or the system is locked again. Otherwise, the flow may return back to step 115. The threshold number and/or the threshold time limit may be adjusted or customized by user. These two conditions may be checked both or singularly. In addition, the step 130 may be an option. The flow may go to step 199 from the step 125 if no match.

If the comparing result of step 125 is a match, one of four candidate steps 135, 150, 160, and 170 may be executed according to user's preference. At step 150, the touch screen shows desktop or computing environment of the system. At step 160, a historical computing environment frozen at the lock moment is shown on the touch screen. At step 170, a sophisticated determination would be performed to decide what to show. User may setup or define multiple customized gestures. Each of the customized gesture is corresponding to a computing environment and/or at least one program, such as phone dial program, music player program, web browser, email manager program, show message (SMS) manager program, navigation program, and map program. If the input gesture is matched to a first customized gesture, the corresponding email manager program would be loaded and shown. If the input gesture is matched to a second customized gesture, the corresponding show message (SMS) manager program would be loaded and shown. In case the input gesture is matched to a default or built-in gesture such as a bar to be dragged, the flow may go to step 150 or 160. Because the system could directly load the corresponding program and/or computing environment according to user's input gesture, it is more convenient and saves the time spent on program selection from the desktop.

The optional step 135 introduces an additional protection mechanism. Since the electronic system may be stolen or misused by people other than owner, user may choose to go to step 135 from step 125 in case a match of gestures is found. In one embodiment, the optional step 135 may be performed if the lock duration is less than a certain period. More detailed, in case user prefers to have a five minute period. If there is a match within five minute since the system is locked, the flow would go to step 150, 160, or 170 and skip the optional step 135. Otherwise, if there is a match within five minute since the system is locked, the flow would go to step 135. User may set the certain period to zero or forever. Consequently, the step 135 would be always performed or always skipped.

The addition challenge in accordance with the present invention is not limited to a specific form. In one example, a password may be required to be inputted through a virtual or physical keyboard. In another example, biological features such as facial characteristics, voice, or finger print of user/owner may be required to be inputted. A simple mathematical or preset question may be used as a challenge. At step 140, the system would determine whether the additional challenge is met or not. If yes, the flow goes to one of the following steps, 150, 160, or 170. Otherwise, the flow goes to step 145 which is similar to step 130. At step 145, the number of retry is compared with a threshold number and/or the pending time since the trigger event or the challenge is compared with a threshold time limit. If the number of retry exceeds the threshold number and/or the pending time exceeds the threshold time limit, the flow goes to the step 199. Otherwise, the flow may go back to step 115 or 135. In addition, the step 130 may be an option. The flow may go to step 199 from the step 140 if no match.

Figure 2:
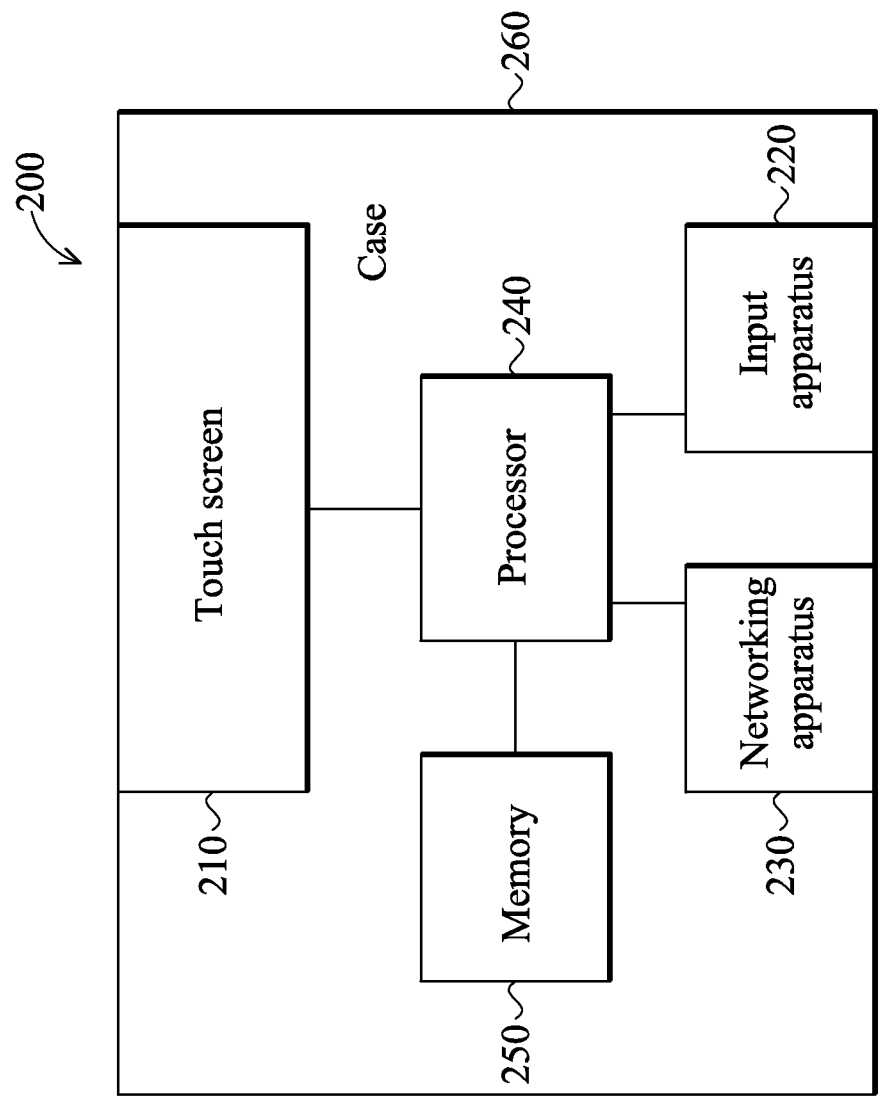
FIG. 2 depicts an electronic system of an embodiment in accordance with the present invention.

Please refer to FIG. 2, which shows an electronic system 200 of an embodiment in accordance with the present invention. The electronic system 200 may comprise a touch screen 210, an input apparatus 220, a networking apparatus 230, a processor 240, a memory 250, and a case 260. The case 260 can protect and encapsulate other components of the electronic system 200. The processor 240 may be one or multiple integrated circuits, which are configured to control and are coupled to the touch screen 210, the input apparatus 220, the networking apparatus 230, the processor 240, and the memory 250.

The memory 250 is configured to store program codes which are executable by the processor 240. In accordance with the present invention, the program codes comprise at least those embodied the flow shown in the FIG. 1. The input apparatus 220 may be an apparatus generates the trigger event of the step 105. It may comprise a button, an acceleration/motion sensor, a camera, a photonic sensor, or any combination. The input apparatus 220 may be also an apparatus receives response to the challenge of step 140. It may comprise a biological feature input apparatus, a camera, a microphone, a finger print scanner, or any combination. The networking apparatus 230 may be an apparatus generates the trigger event of the step 105. It may connect to any applicable network such as wireless local area network, personal network such as Bluetooth and wireless universal serial bus, or wide area access network such as 2G GSM, 3G CDMA, and 4G mobile wireless communication systems.

Figure 3:
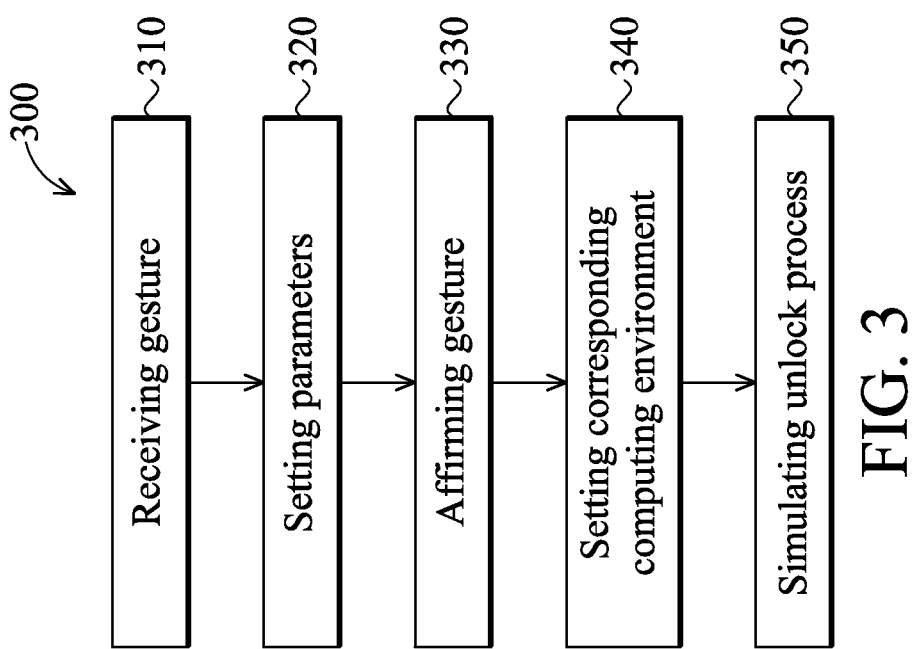
FIG. 3 illustrates a gesture configuration flow chart of an embodiment in accordance with the present invention.

Please refer to FIG. 3, which shows a gesture configuration flow chart of an embodiment in accordance with the present invention. The flow 300 may be implemented in a set of configuration program code. First at step 310, an input gesture is received via a touch screen. The gesture may be shown or replay on the touch screen for user verification. Next, at the following step 320, applicable parameters of gesture and corresponding error ranges may be adjusted or setup by user. The parameters of gesture at least comprise dimension, orientation, time duration, and pressure. User can individually set applicability of these parameters and corresponding error range. In one example, the electronic system may give a default set of parameters and default error ranges. After applicable parameters of gesture and corresponding error ranges are set, the flow goes to step 330. At this step 330, user is required to input the gesture again to affirm it. Next step 340 is an option to configure a computing environment and/or a program corresponding to the gesture. For example, user may prefer to show desktop, computing environment frozen when the system is locked, or a corresponding program, i.e., user can choose step 150, 160, or 170 shown in the FIG. 1. The last step 350 of the flow 330 is also an option. An unlock flow is simulated in this last step 350. In other words, most parts of flow 100 shown in the FIG. 1 will be executed in order to verify whether the flow 300 is completed. However, in this simulated version of flow 100, the flow does not go to step 199 to lock the system but go back to the configuration program.

The configuration program may user different user interfaces to set up additional challenge of the flow 100. The challenges may be related to biological feature recognition, password comparison, retry threshold number, and threshold time limit. For the stored gestures and corresponding program/computing environment relations, the configuration program may perform maintenance such as addition, deletion, query, and modification operations on them.

Figure 4:
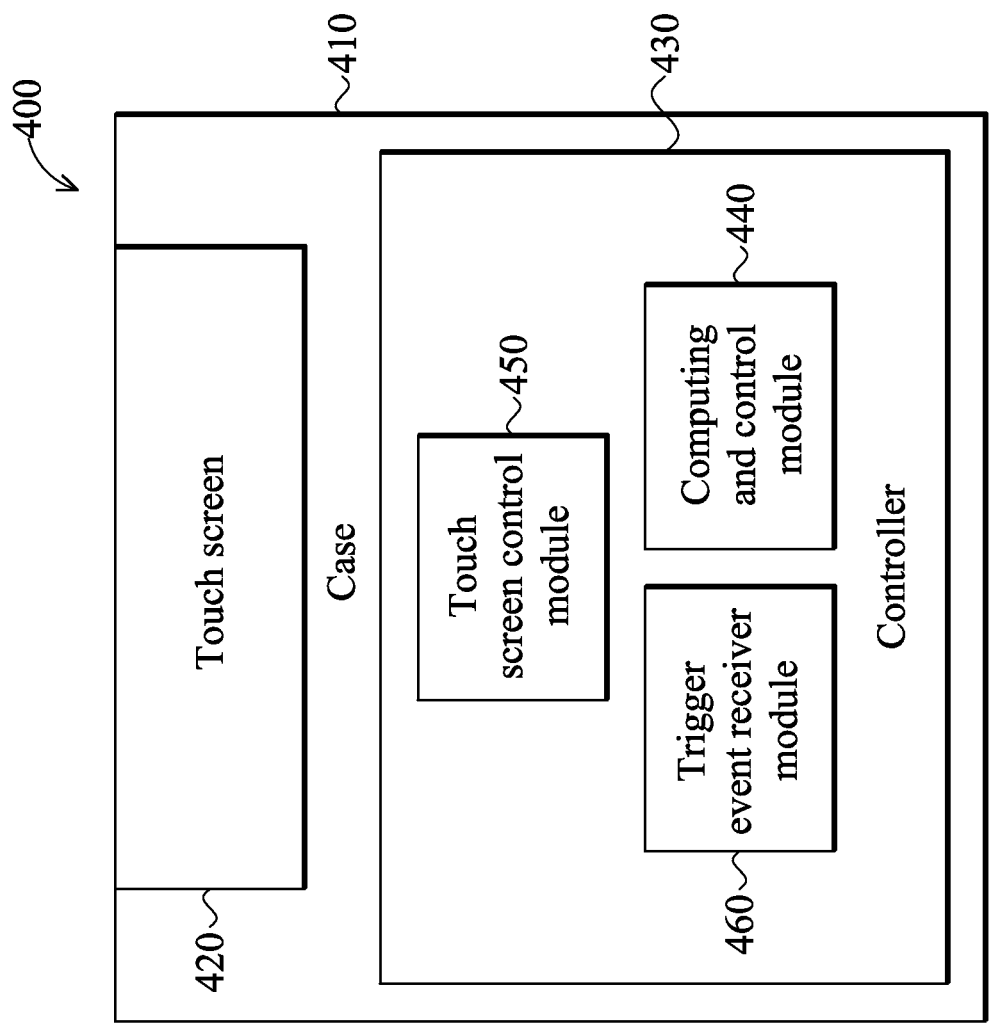
FIG. 4 demonstrates a block diagram of an electronic system 400 in accordance with an embodiment of the present invention.

Please refer to FIG. 4, which shows a block diagram of an electronic system 400 in accordance with an embodiment of the present invention. The electronic system 400 comprises a case 410 for encapsulating a touch screen 420 and a controller 430. The controller 430 is coupled to the touch screen 420 and configured to control the electronic system 400. The controller 430 further comprises a touch screen control module 450, a trigger event receiver module 440, and a computing and control module 460.

The trigger event receiver module 440 is configured to receive a trigger event when the electronic system 400 is locked. Description of fore mentioned trigger event is applicable to this embodiment. After receiving the trigger event, the touch screen control module 450 activates the touch screen 420 and receives an input gesture via the touch screen 420. The input gesture is compared with a customized gesture by the computing and control module 460. If the input gesture is matched with the customized gesture, the electronic system 400 is unlocked. The customized gesture is customized by user, not a default or built-in unlock gesture.

In accordance with the present invention, the electronic system 400 shown in the FIG. 4 may be equivalent to the electronic system 200 shown in the FIG. 2. The controller 430 may be equivalent to the processor 240. The touch screen control module 450, a trigger event receiver module 440, and a computing and control module 460 may be parts of the processor 240.

In accordance with the present invention, the computing environment which may be correlated to a specific customized gesture is not limited to a specific program only. It may be corresponding to another user's computing environment. For example, if a gesture of a first user is received, the electronic system is unlocked and the account of the first user is logged in. The touch screen shows computing environment of the first user account. If a gesture of a second user is received, the electronic system is unlocked and the account of the second user is logged in. The touch screen shows computing environment of the second user account. The functionality may be performed if the system is locked and no account is logged in, or if the system is locked when the first user account is logged in given that the second user account is more privileged. For example, if the second user is the administrator of the electronic system or supervisor of the first user, the system may log out the first user account and log in the second user and show the computing environment corresponding to the gesture inputted by the second user.

In accordance with the present invention, the flows 100 and 300 may be executed by the controller 430 and the processor 240. Those skilled in the art know how to use software, hardware, firmware, and any combination of them to implement the present invention.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for unlocking an electronic system equipping with a touch screen, comprising:
    receiving a trigger event when the electronic system is locked;
    activating the touch screen;
    receiving an input gesture by the touch screen;
    comparing the input gesture with a first customized gesture; and
    unlocking the electronic system if the input gesture and the first customized gesture are matched,
    wherein the first customized gesture is customized by a first user of the electronic system by a customization method using a configuration program, the customization method comprising:
    receiving the first customized gesture;
    setting a parameter set of the first customized gesture;
    affirming the first customized gesture according to the parameter set;
    setting a computing environment and/or a program corresponding to the first customized gesture;
    receiving the trigger event;
    activating the touch screen;
    receiving a test input gesture by the touch screen;
    comparing the test input gesture with the first customized gesture;
    prompting additional challenge;
    determining whether response is met with the additional challenge;
    unlocking the electronic system if the additional challenge is met with response;
    determining whether a threshold number or a threshold time limit is exceeded if the additional challenge is not met with response; and
    remaining lock of the electronic system if a threshold number or a threshold time limit is exceeded,
    wherein when the test input gesture does not match with the first customized gesture in the customization method, the electronic system returns to the configuration program.

2. The method of claim 1, wherein the trigger event is generated by an apparatus chosen from any one of the followings:
- a button;
- the touch screen, wherein the scan period of touching is lengthened;
- an acceleration sensor;
- a touching apparatus other than the touch screen;
- a photonic sensor; and
- a camera.

3. The method of claim 1, wherein the activating step further comprise prompting user for unlock, wherein the prompt includes any combination of text, graphics, animation, and sounds, wherein the prompting step further comprise at least one of the following:
- prompting user regarding to the first customized gesture; and
- prompting user regarding to the unlock gesture.

4. The method of claim 1, wherein the first customized gesture comprises at least one of the following:
- an absolute trace of single finger moving on the touch screen; and
- a relative trace of multiple finger moving on the touch screen,
- wherein a parameter set of the first customized gesture comprises any combination of the following:
- dimension;
- orientation;
- time duration;
- pressure;
- error range of dimension;
- error range of orientation;
- error range of time duration; and
- error range of pressure,
- wherein the match of the input gesture and the first customized gesture is based on the comparison of the parameter set.

5. The method of claim 1, the method further comprises:
- determining whether a threshold number or a threshold time limit is exceeded if the input gesture is not matched with the first customized gesture; and
- remaining lock of the electronic system if a threshold number or a threshold time limit is exceeded.

6. The method of claim 1, wherein after the unlocking, the method further comprises at least one of the following:
- displaying desktop;
- recovering screen before the electronic system is locked;
- loading a first computing environment corresponding to the first customized gesture of the first user, wherein the first user is logged in when the electronic system is locked; and
- logging out of the first user and loading a second computing environment corresponding to a second customized gesture of a second user.

7. The method of claim 1, wherein the customization method further comprising:
- replaying the first customized gesture on the touch screen for user verification after receiving the first customized gesture.

8. A method for customizing a first customized gesture to unlock an electronic system equipping with a touch screen using a configuration program, comprising:
- receiving the first customized gesture;
- setting a parameter set of the first customized gesture;
- affirming the first customized gesture according to the parameter set;
- setting a computing environment and/or a program corresponding to the first customized gesture;
- receiving the trigger event;
- activating the touch screen;
- receiving a test input gesture by the touch screen; and
- comparing the test input gesture with the first customized gesture;
- prompting additional challenge;
- determining whether response is met with the additional challenge;
- unlocking the electronic system if the additional challenge is met with response;
- determining whether a threshold number or a threshold time limit is exceeded if the additional challenge is not met with response; and
- remaining lock of the electronic system if a threshold number or a threshold time limit is exceeded,
wherein when the test input gesture does not match with the first customized gesture in the customization method, the electronic system returns to the configuration program.

9. The method of claim 8, further comprising:
- Receiving a second customized gesture;
- Setting a parameter set of the second customized gesture; and
- Affirming the second customized gesture according to the parameter set of the second customized gesture, wherein the second customized gesture is customized by user of the electronic system, not a default unlock gesture built in the electronic system;
- Comparing the input gesture with the second customized gesture;
- Loading a first program if the input gesture and the first customized gesture are matched, and
- Unlocking the electronic system and loading a second program if the input gesture and the second customized gesture are matched.

10. A controller for an electronic system equipping with a touch screen, comprising:
- a trigger event receiver module for receiving a trigger event when the electronic system is locked;
- a touch screen control module for activating the touch screen and receiving an input gesture; and
- a computing and control module for comparing the input gesture with a first customized gesture and unlocking the electronic system if the input gesture and the first customized gesture are matched,
wherein the first customized gesture is customized by a first user of the electronic system by a customization method using a configuration program, the customization method comprising:
- receiving the first customized gesture;
- setting a parameter set of the first customized gesture;
- affirming the first customized gesture according to the parameter set;
- setting a computing environment and/or a program corresponding to the first customized gesture;
- receiving the trigger event;
- activating the touch screen;
- receiving a test input gesture by the touch screen;
- comparing the test input gesture with the first customized gesture;
- prompting additional challenge;
- determining whether response is met with the additional challenge;
- unlocking the electronic system if the additional challenge is met with response;

determining whether a threshold number or a threshold time limit is exceeded if the additional challenge is not met with response; and remaining lock of the electronic system if a threshold number or a threshold time limit is exceeded, wherein when the test input gesture does not match with the first customized gesture in the customization method, the electronic system returns to the configuration program.

11. The controller of claim 10, wherein the controller is configured for prompting user for unlock, wherein the prompt includes any combination of text, graphics, animation, and sounds, wherein the touch screen control module is further configured to perform at least one of the following:

prompting user regarding to the first customized gesture; and prompting user regarding to the unlock gesture.

12. The controller of claim 10, wherein the first customized gesture comprises at least one of the following:

an absolute trace of single finger moving on the touch screen; and a relative trace of multiple finger moving on the touch screen, wherein a parameter set of the first customized gesture comprises any combination of the following:

dimension;
orientation;
time duration;
pressure;
error range of dimension;
error range of orientation;
error range of time duration; and
error range of pressure, wherein the match of the input gesture and the first customized gesture is based on the comparison of the parameter set.

13. An electronic system, comprising:

a case;

a touch screen, encapsulated by the case; and a controller, encapsulated by the case and coupled to the touch screen, the controller comprises:

a trigger event receiver module for receiving a trigger event when the electronic system is locked;

a touch screen control module for activating the touch screen and receiving an input gesture; and a computing and control module for comparing the input gesture with a first customized gesture and unlocking the electronic system if the input gesture and the first customized gesture are matched, wherein the first customized gesture is customized by a first user of the electronic system by a customization method using a configuration program, the customization method comprising:

receiving the first customized gesture;
setting a parameter set of the first customized gesture;
affirming the first customized gesture according to the parameter set;
setting a computing environment and/or a program corresponding to the first customized gesture;
receiving the trigger event;
activating the touch screen;
receiving a test input gesture by the touch screen; and
comparing the test input gesture with the first customized gesture;
prompting additional challenge;
determining whether response is met with the additional challenge;

unlocking the electronic system if the additional challenge is met with response;

determining whether a threshold number or a threshold time limit is exceeded if the additional challenge is not met with response; and remaining lock of the electronic system if a threshold number or a threshold time limit is exceeded, wherein when the test input gesture does not match with the first customized gesture in the customization method, the electronic system returns to the configuration program.

14. The electronic system of claim 13, wherein the trigger event is generated by an apparatus of the electronic system chosen from any one of the followings:

a button;
the touch screen, wherein the scan period of touching is lengthened;
an acceleration sensor;
a touching apparatus other than the touch screen;
a photonic sensor; and
a camera.

15. The electronic system of claim 13, wherein the controller is configured for prompting user for unlock, wherein the prompt includes any combination of text, graphics, animation, and sounds, wherein the touch screen control module is further configured to perform at least one of the following:

prompting user regarding to the first customized gesture; and prompting user regarding to the unlock gesture.

16. The electronic system of claim 13, wherein the first customized gesture comprises at least one of the following:

an absolute trace of single finger moving on the touch screen; and a relative trace of multiple finger moving on the touch screen, wherein a parameter set of the first customized gesture comprises any combination of the following:

dimension;
orientation;
time duration;
pressure;
error range of dimension;
error range of orientation;
error range of time duration; and
error range of pressure, wherein the match of the input gesture and the first customized gesture is based on the comparison of the parameter set.

17. The electronic system of claim 13, wherein after the unlocking, the controller is further configured to perform at least one of the following:

displaying desktop;
recovering screen before the electronic system is locked;
loading a first computing environment corresponding to the first customized gesture of the first user, wherein the first user is logged in when the electronic system is locked; and
logging out of the first user and loading a second computing environment corresponding to a second customized gesture of a second user.

18. The method of claim 1, further comprising:

comparing the input gesture with a second customized gesture;
loading a first program if the input gesture and the first customized gesture are matched, and
unlocking the electronic system and loading a second program if the input gesture and the second customized gesture are matched, wherein the second customized gesture is customized by user of the electronic system, not a default unlock gesture built in the electronic system.

19. The controller of claim 10, wherein the computing and control module compares the input gesture with a second customized gesture, the computing and control module loads a first program if the input gesture and the first customized gesture are matched, the computing and control module unlocks the electronic system and loads a second program if the input gesture and the second customized gesture are matched, and the second customized gesture is customized by user of the electronic system, not a default unlock gesture built in the electronic system.

20. The electronic system of claim 13, wherein the computing and control module compares the input gesture with a second customized gesture, the computing and control module loads a first program if the input gesture and the first customized gesture are matched, the computing and control module unlocks the electronic system and loads a second program if the input gesture and the second customized gesture are matched, and the second customized gesture is customized by user of the electronic system, not a default unlock gesture built in the electronic system.

\* \* \* \* \*